US008479177B2

(12) United States Patent
Kirshnaswamy et al.

(10) Patent No.: US 8,479,177 B2
(45) Date of Patent: Jul. 2, 2013

(54) ATTRIBUTE BASED METHOD REDIRECTION

(75) Inventors: Raja Kirshnaswamy, Redmond, WA (US); Yi Zhang, Shanghai (CN); Scott D. Mosier, North Bend, WA (US); Ladislav Prosek, Bellevue, WA (US); Xiaoying Guo, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 1076 days.

(21) Appl. No.: 12/469,664

(22) Filed: May 20, 2009

(65) Prior Publication Data

US 2010/0299659 A1 Nov. 25, 2010

(51) Int. Cl.
*G06F 9/44* (2006.01)
*G06F 9/45* (2006.01)
*G06F 3/00* (2006.01)

(52) U.S. Cl.
USPC ........... 717/147; 717/146; 717/148; 717/162; 719/332

(58) Field of Classification Search
None
See application file for complete search history.

(56) References Cited

U.S. PATENT DOCUMENTS

| | | | | |
|---|---|---|---|---|
| 5,659,751 A * | 8/1997 | Heninger | | 719/332 |
| 5,923,882 A * | 7/1999 | Ho et al. | | 717/147 |
| 6,182,277 B1 | 1/2001 | DeGroot et al. | | |
| 6,401,100 B1 * | 6/2002 | Gladieux | | 1/1 |
| 6,460,178 B1 * | 10/2002 | Chan et al. | | 717/147 |
| 7,360,206 B1 * | 4/2008 | Hatcher | | 717/139 |
| 7,650,599 B2 * | 1/2010 | Smith et al. | | 717/146 |
| 7,814,470 B2 * | 10/2010 | Mamou et al. | | 717/162 |
| 7,913,240 B2 * | 3/2011 | Kielstra et al. | | 717/148 |
| 8,136,104 B2 * | 3/2012 | Papakipos et al. | | 717/146 |
| 2005/0149919 A1 * | 7/2005 | Rothman et al. | | 717/162 |
| 2005/0188272 A1 * | 8/2005 | Bodorin et al. | | 714/38 |
| 2006/0020914 A1 * | 1/2006 | Arthurs et al. | | 717/106 |
| 2006/0179441 A1 * | 8/2006 | Sigurdsson et al. | | 719/330 |
| 2007/0083484 A1 * | 4/2007 | McVeigh et al. | | 707/1 |
| 2007/0261044 A1 * | 11/2007 | Clark | | 717/162 |
| 2008/0059269 A1 * | 3/2008 | Willis et al. | | 705/8 |

OTHER PUBLICATIONS

Keith E Moore et al. Building Evolvable Systems: The ORBlite Project, [Online], HP1997, pp. 1-14, [Retrieved from Internet on Feb. 19, 2013], <http://www.hpl.hp.com/hpjournal/97feb/feb97a9.pdf>.*
Stephan Preub et al., "Overview of Spontaneous Networking—Evolving Concepts and Technologies", [Online], 2000, pp. 1-14, [Retrieved from Internet on Feb. 19, 2013], <http://citeseerx.ist.psu.edu/viewdoc/download?doi=10.1.1.18.6929&rep=rep1&type=pdf>.*
T. Brown, A. Pasetti et al., "A Reusable and Platform-Independent Framework for Distributed Control Systems", [Online], IEEE 2001, pp. 1-11, [Retrieved from Internet on Feb. 19, 2013], <http://ieeexplore.ieee.org/stamp/stamp.jsp?tp=&arnumber=964169>.*

(Continued)

*Primary Examiner* — Thuy Dao
*Assistant Examiner* — Ziaul A Chowdhury
(74) *Attorney, Agent, or Firm* — Rau Patents, LLC

(57) ABSTRACT

A programming environment may have an abstract interface definition that may contain a redirection definition that may cause a call to be bound to a redirected method or function. The redirected method or function may be a conditional redirection, and some embodiments may perform various checks including signature checks, static and runtime access checks, and other verifications for the redirected method. The redirection may enable a programmer to modify a portion of an interface without having to re-implement all of the functions of the interface.

19 Claims, 3 Drawing Sheets

OTHER PUBLICATIONS

Gabriel Antoniu et al., "Enabling Transparent Data Sharing in Component Models", [Online], IEEE 2006, pp. 1-4, [Retrieved from Internet on Feb. 19, 2013], <http://ieeexplore.ieee.org/stamp/stamp.jsp?tp=&arnumber=1630853>.*

Schult, et al., "Aspect-Oriented Programming with C# and .NET", Proceedings of the Fifth IEEE International Symposium on Object-Oriented Real-Time Distributed Computing, Retrieved at <<http://www.dcl.hpi.uni-potsdam.de/papers/papers/isorc2002.pdf>>, Apr. 29-May 1, 2002, pp. 9.

Hicks, Michael, "Dynamic Software Updating: Introduction and Foundation", Retrieved at <<http://209.85.175.132/search?q=cache:r0HVuoPC9a0J:www.cs.uoregon.edu/research/summerschool/summer06/lectures/oregon-dsu.ppt+%22type+system%22+%22redirect+function%22&hl=en&ct=clnk&cd=5&gl=in>>, 2006, pp. 73.

Nishimura, Susumu, "Static Typing for Dynamic Messages", In Proceedings of the 25 th ACM Symposium on Principles of Programming Languages, Retrieved at <<http://citeseerx.ist.psu.edu/viewdoc/download;jsessionid=5D4356AC26575A0DC3E4AEEF0D2E78A8?doi=10.1.1.53.7730&rep=rep1&type=pdf>>, 1998, pp. 1-13.

Findler, et al., "Contract Soundness for Object-Oriented Languages", Proceedings of the 2001 ACM SIGPLAN Conference on Object-Oriented Programming Systems, Languages and Applications, Retrieved at <<http://citeseerx.ist.psu.edu/viewdoc/download?doi=10.1.1.29.2898&rep=rep1&type=pdf>>, Oct. 14-18, 2001, pp. 15.

Herrmann, Stephan, "Programming with Roles in ObjectTeams/Java", AAAI Fall Symposium: "Roles, An Interdisciplinary Perspective", Retrieved at <<https://www.aaai.org/Papers/Symposia/Fall/2005/FS-05-08/FS05-08-012.pdf>>, 2005, pp. 8.

Perry, N., "Implementing Non-Strict Evaluation on OOVMs", In IEE Proceedings—Software, Retrieved at <<http://ieeexplore.ieee.org/stamp/stamp.jsp?arnumber=1577583&isnumber=33346>>, vol. 152, No. 6, Dec. 2005, pp. 309-315.

Cugola, et al., "Support for Software Federations: the PIE1 Platform", Retrieved at <<http://citeseerx.ist.psu.edu/viewdoc/download?doi=10.1.1.1.8778&rep=rep1&type=pdf>>, 2000, pp. 1-16.

* cited by examiner

ATTRIBUTE BASED METHOD REDIRECTION

BACKGROUND

Computer programming environments can expose limitations of the environments and interfaces to other programming environments. Often, an interface between one programming environment to another programming environment may implement a subset of the functionality across the interface. In commercial programming products, the interface may be very complex and provide a high level of functionality.

In some cases, the functionality of the interface may not provide a specific function or capability precisely as desired. In such cases, a programmer may have very few options. One such option may be to write extensive amount of code to create a custom interface that re-implements the interface. In cases where the desired function is a slight variant in a very complex interface, the cost of implementing the desired function may be very high in terms of value for the amount of programming time.

SUMMARY

A programming environment may have an abstract interface definition that may contain a redirection definition that may cause a call to be bound to a redirected method or function. The redirected method or function may be a conditional redirection, and some embodiments may perform various checks including signature checks, static and runtime access checks, and other verifications for the redirected method. The redirection may enable a programmer to modify a portion of an interface without having to re-implement all of the functions of the interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
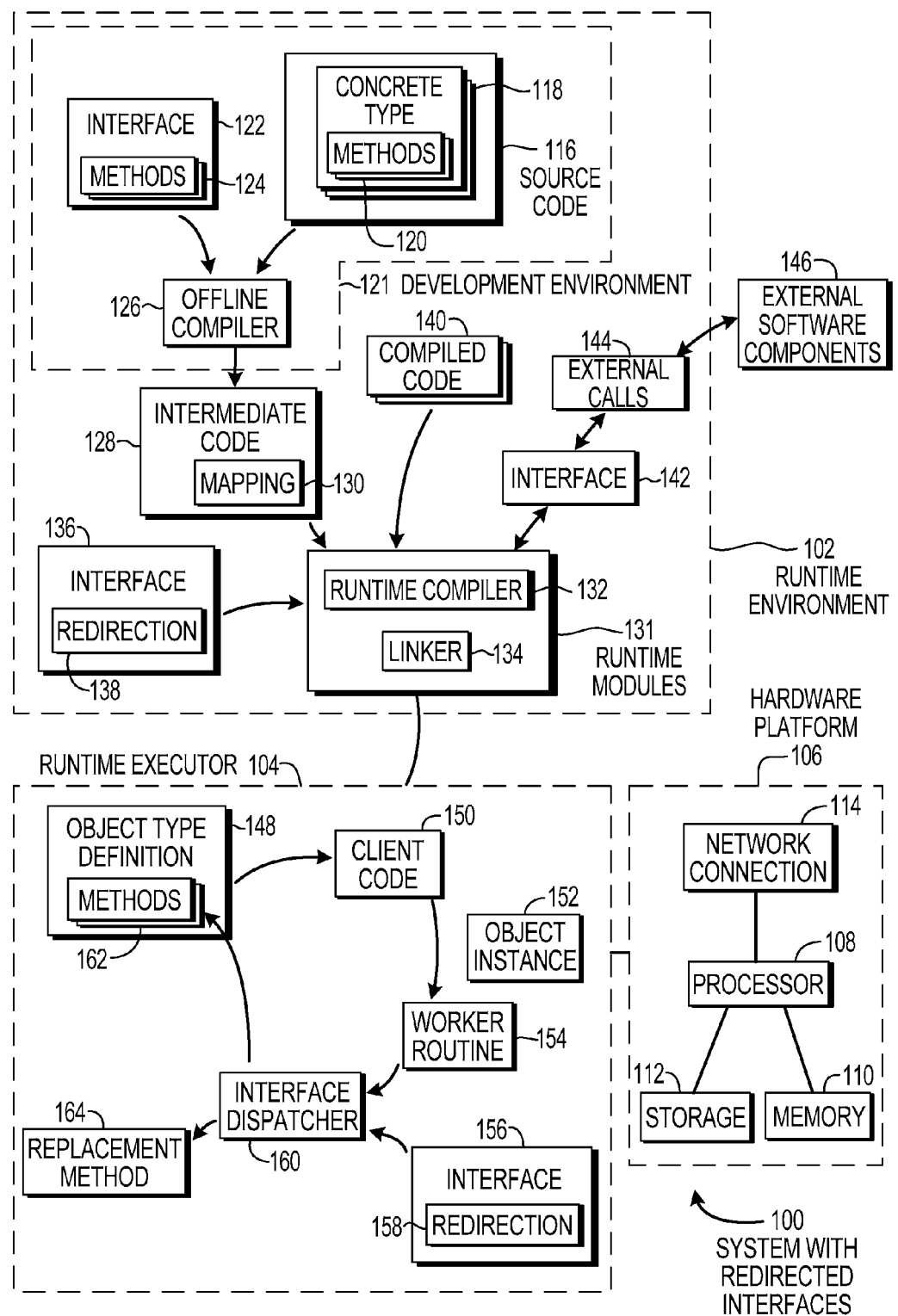
FIG. 1 is a diagram illustration of an embodiment showing a system with redirections incorporated into interfaces.

An interface may be defined as an abstract type that is implemented by one or more concrete types. The interface may contain a redirection that may cause a link to a different method than would have otherwise been called. The redirection may be conditional or unconditional, and may provide various checks or limitations in some embodiments.

An interface may be an abstract type that is implemented by concrete types. Each concrete type may implement methods described in the interface, and in many language systems, such a concrete type may implement each and every method described in the interface.

During execution, a client code may pass an object instance of the concrete type to a worker code, and the worker code may call through the interface to reach a method within the concrete type. When the interface contains a redirection, an interface dispatcher may link to a different method as defined in the redirection.

In many embodiments, the interface dispatcher may perform several checks to validate the redirected method and ensure that the calling routine has appropriate permissions to execute the redirected method. In some embodiments, the redirected method may be permitted when the signature of the redirected method matches the signature of method that would have been called without the redirection.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with redirection statements in interface types. Embodiment 100 is an example of a runtime execution embodiment of a system that permits and executes redirection statements in an abstract interface type.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of a runtime environment that has redirected interfaces. In general, a runtime environment may be a program execution system that performs linking at runtime. In many cases, a runtime environment may perform compilation at runtime as well. In such cases, source code may be compiled into an intermediate language at compile time, and at runtime the intermediate language may be further compiled into executable code.

In a runtime environment 102, executable code is created at runtime. Typically, much of the code optimization and compiling are done prior to runtime, but the code linking may be performed when the code is executed. In a runtime executor 104, the compiled and linked code may be executed. By linking at runtime, the most up to date versions of libraries may be used, or the code may be linked to different libraries or other code to create different versions of an application at runtime.

In many runtime environments, one source code may be used in different hardware platforms. The source code may be initially compiled into an intermediate code, and then further compiled at runtime to match the particularities of a hardware platform on which the code may be executed. Different hardware platforms may have different runtime compilers, allowing a single source code to be leveraged over many hardware platforms.

A runtime embodiment as shown in embodiment 100 is merely one example of an implementation of a redirected interface. Other embodiments may perform compilation and binding prior to runtime to create executable code that is stored and executed directly without an intermediate compilation or runtime linking. For the purposes of example, a runtime embodiment is used in this specification but is not meant to be limiting.

Runtime embodiments may be available for many different hardware platforms 106. In general, a hardware platform 106 may have a processor 108 and some memory 110 that may be random access memory easily accessible by the processor 108. The hardware platform 106 may have some nonvolatile storage 112, as well as a network connection 114 and other peripherals. In many embodiments, the memory 110 may be volatile storage separate from the nonvolatile storage 112. For example, the nonvolatile storage 112 may be a hard disk or solid state mass storage system.

A typical hardware platform may be a personal computer. In many cases, personal computers may have sufficient storage capacity and processing power to perform the tasks associated with a runtime environment. In a typical deployment, a personal computer may receive intermediate code that can be linked at runtime to libraries of code adapted to the particular configuration of the hardware platform. In such a deployment, different personal computers with different hardware configurations may each receive and use the same intermediate code.

The hardware platform 106 may be any type of device that contains a processor for executing instructions. Such devices may be complex computing devices such as a personal computer, server computer, or other general purpose device. In some cases, the hardware platform 106 may be a limited purpose or tailored device that performs a specific set of tasks, such as a network switch, mass storage system, or other tailored device. In still other cases, the hardware platform 106 may be a network appliance, network connected instrument, game console, or other network connected device. In yet other cases, the hardware platform 106 may be a portable device such as a personal digital assistant, cellular telephone, handheld scanner, point of sale device, or other device. The examples above are not meant to be limiting in any manner, but are intended to show a variety of examples.

The runtime environment 102 may include an offline set of components and a runtime set of components. The offline set of components may be those components used to create, edit, and debug source code, then compile the source code into intermediate code. Such components may be found in a development environment 121. The runtime set of components may include a runtime compiler 132, linker 134, and a runtime executor 104.

In a development environment 121, a developer may create source code 116 that contains concrete types 118 that have methods 120 that implement an interface 122 that contains abstract definitions for the methods 124.

The interface 122 may be an abstract type serves as a contract for objects that that implement the interface. Each object that implements the interface, as part of the contract, has a method 120 corresponding to each method 124 defined in the interface. Because an interface 122 is abstract, the interface 122 may not be instantiated as an object, but an object that implements the interface 122 may comply with the interface definition.

Because objects that implement the interface 122 comply with the interface, objects of many different classes may be used without knowing the type of class. Even though the classes may be different, the commonly implemented interface allows similar operations regardless of the object type.

Within each concrete type 118, each method 124 defined in the interface 122 is implemented. The concrete types 118 may each have different implementations of the interface, but may comply with the interface by receiving and returning a specific set of parameters. In some cases, each of the concrete types 118 may also have many other methods that are not related to the interface 122.

The term concrete type is used to describe an actual implementation of an object, as compared to an abstract type which describes properties of an object within object oriented programming. Different languages and programming environments may have various implementations, syntax, rules, terminology, or other concepts that implement the concepts of an abstract type and concrete type. The concepts described in this specification are not directed at any particular programming language or implementation but may be applied to different languages and different implementations of the same language.

During execution, different objects may be created of the various concrete types. The different objects may be passed to some code that also implements the interface 122. Within the code, a call to a method 124 will generally be mapped to the corresponding method 120 based on which type was passed to the code. In a typical implementation, an offline compiler 126 may create intermediate code 128 that contains a mapping 130. The mapping 130 may contain a map between the methods 124 defined in the interface 122 and the methods 120 implemented in the concrete type 118.

In some cases, the interface 122 may be defined with a redirection. The redirection may cause the execution of a method to be redirected to a different method 120 from the originally intended method. Within this specification and claims, the terms "replacement method" is the method executed by the redirection, and the "original method" is the originally intended method that would have been executed but for the redirection.

In some cases, the source code 116 may be designed, written, and debugged using the interface 122 to generate the intermediate code 128. During runtime, however, a different version of the interface 122 may be included as interface 136 during runtime linking. The interface 136 may include a redirection 138 which was not included in the interface 122.

The redirection 138 may allow a programmer to modify the operation of an interface 136 without having to create another full implementation of the interface 122. The redirection 138 may include a reference to a second version of a method 120 or some other replacement for a method 120.

The redirection 138 may be useful in situations where the source code 116 is unavailable to the developer and where the developer may not be able to change the method 120 directly. The redirection 138 may allow the developer to intercept a call to a method 120 and redirect the call to some other method.

In one use scenario, some external software components 146 may be defined outside of the runtime environment 102. A set of external calls 144 may implement an interface 142. When a developer wishes to change one of the external calls, the interface 142 may be updated with a redirection statement that allows the developer to substitute a new method in place of one of the external calls.

In a situation where the external calls 144 may be precompiled and distributed with the external software components 146, the developer may either use the redirection mechanism or may re-implement the entire set of external calls 144 using the interface 142. In some complex cases, the set of external calls 144 may be many hundreds of individual methods, making the re-implementation a very complex task.

The redirection 138 may be implemented as a conditional or unconditional redirection. In an unconditional redirection, every call to a specific method may be redirected to a new method. In a conditional redirection, a call may be evaluated by type or other parameters to determine if a redirection may occur. In some implementations, the conditions may evaluate the values in various calling parameters to determine if a redirection may occur. If the conditions are not met in a conditional redirection, the default method may be called. The default method may be the method that would have been called if the redirection was not present.

In some embodiments, a runtime executor 104 may apply various analyses to the replacement method. The analyses may include determining if the permission profile of the currently executing process is able to access and execute the replacement method. The runtime executor 104 may analyze whether the user has access to the replacement method, for example, and if such access includes execution access for the method.

In another analysis, the runtime executor 104 may determine if the replacement method is a public or private method within an assembly. If the replacement method is a public method, the replacement method may be executed. If the replacement method is a private method, the runtime executor 104 may determine if the private method is available within the scope of the currently executing code.

In some embodiments, if the runtime executor 104 determines that the replacement method is not available due to permission settings, the runtime executor 104 may execute the original method that would have been called if the redirection were not present. In other embodiments, the runtime executor 104 may throw an error in the same situation.

Some embodiments may enforce signature compatibility between the replacement method and the original method. A signature may include the input and output parameters used to communicate with the original method. When signature compatibility is enforced, the signature of the replacement method may be compared to the signature of the original method. When the two signatures are precisely the same, the replacement method may be permitted to be executed. If the signatures are different, the replacement method may not be executed. In some such cases, an error may be thrown or the original method may be executed.

The signature comparison may be used in embodiments where a replacement method is restricted to be compatible with the original method. Some embodiments may not include such a comparison.

The runtime modules 131 may include a runtime compiler 132, a linker 134, and the runtime executor 104. The runtime compiler 132 may compile intermediate code 128 to create executable code that is executable on the hardware platform 106. The linker 134 may link the intermediate code 128, updated interface 136, other compiled code 140, and external calls 144 to create the executable code that operates on the hardware platform 106.

Within the runtime executor 104, the executable code may operate by having an object type definition 148, which may contain various methods 162. Client code 150 may create object instances 152 from the object type definition 148 and may pass the object instances 152 to a worker routine 154.

The worker routine 154 may receive the object instance 152 and may call a method defined in the interface 156. The interface dispatcher 160 is an execution component that may match the methods in the interface 158 with those in the object type definition 148. The interface dispatcher 160 may evaluate the redirection 158 and may cause a replacement method 164 to be executed in place of the method 162. The interface dispatcher 160 may be the component that evaluates the redirection to determine if the conditions, permissions, and other factors are met, such as signature verification.

Figure 2:
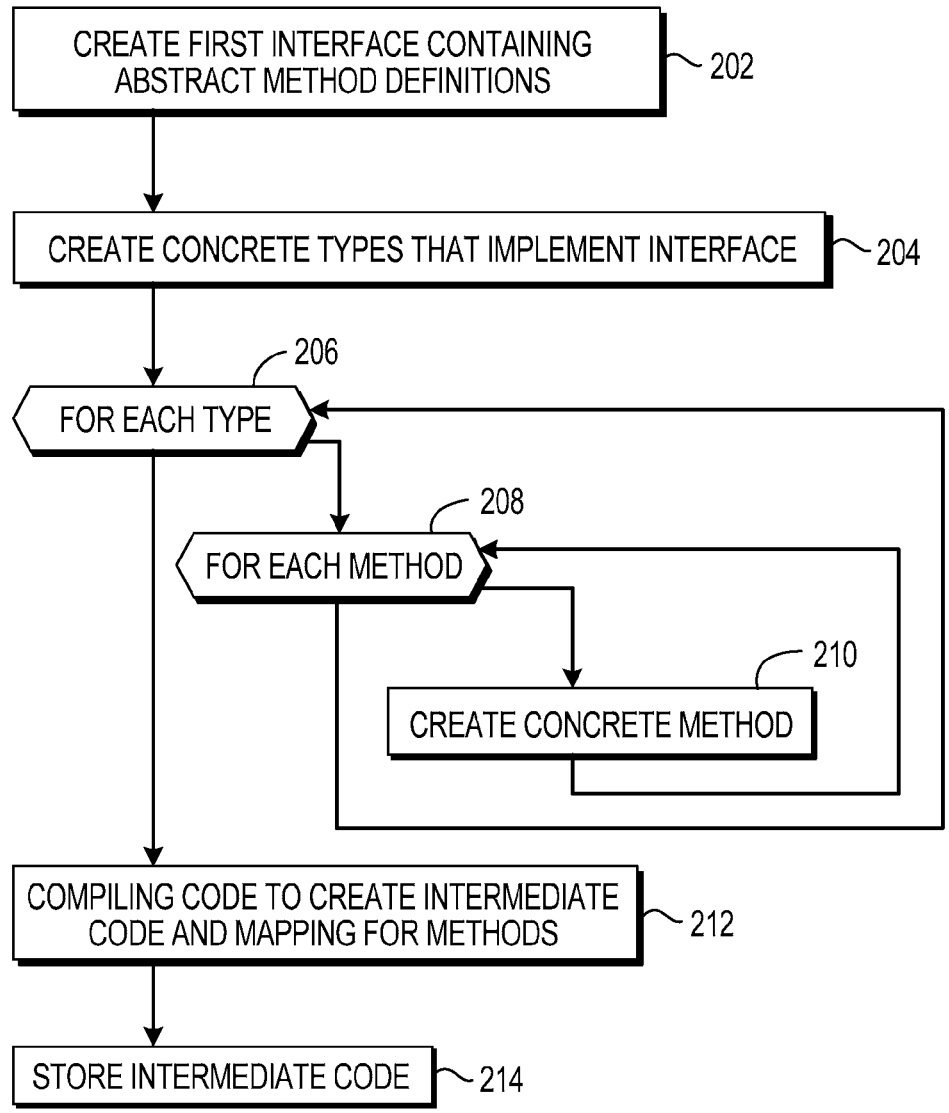
FIG. 2 is a flowchart illustration of an embodiment showing a method for pre-runtime operations in a runtime environment.

FIG. 2 is a flowchart illustration of an embodiment 200 showing a method for pre-runtime operations. Embodiment 200 is a simplified example of a method that may be performed by a developer during the programming phase of an application.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is an example of operations that may be performed prior to runtime in a runtime environment. In embodiment 200, code may be generated and compiled into intermediate code. Embodiment 300 presented later in this specification is an example of the operations that may be performed at runtime in a runtime environment.

A first interface may be created in block 202. The interface may be an abstract type that defines several methods. Each of the methods may be defined with input and output parameters, and the interface may operate as a contract stating that all objects that implement the interface will comply with the contract. Because the interface is an abstract type, the interface itself may not be instantiated into an object.

Different languages may have different mechanisms for defining an interface, and some languages may use different syntax, naming conventions, notation, or other mechanisms to define an abstract type. In various languages and programming environments, abstract types may be known as abstract base classes, interfaces, traits, mixins, flavors, or roles. Note that these names refer to different language constructs which are or may be used to implement abstract types.

Abstract classes can be created, signified, or simulated in several ways. In some embodiments, an abstract class may be created using an explicit statement or construct. In other embodiments, an abstract class may be implicitly defined. In some languages, an abstract class may be created by use of an explicit keyword 'abstract' in the class definition, as in Java. In some languages, an abstract class may be created by including, in the class definition, one or more methods (called pure virtual functions in C++), which the class is declared to accept as part of its protocol, but for which no implementation is provided. Other languages may create abstract classes by inheriting from an abstract type, and not overriding all missing features necessary to complete the class definition. In many dynamically typed languages such as Smalltalk, any class which sends a particular method to an object on which it is working, but doesn't implement that method, can be considered abstract.

Abstract classes and interfaces may be implemented in different object oriented languages, including C++, C#, Common Lisp, Java, PHP, Smalltalk, Visual Basic, and many other languages.

In block 204, various concrete types may be created that will implement the interface. For each of the concrete types in block 206, and for each method in block 208, a concrete method may be defined in block 210. The concrete method may be a full expression of each method defined in the interface.

After defining all of the various methods, the code may be compiled in block 212 to create intermediate code and a mapping of the methods. The mapping of block 212 may map the methods defined in an interface to methods defined in the concrete types.

During execution, a worker routine may attempt to perform an operation on an object defined using a concrete type. The operation may involve executing one of the methods defined in the interface. The mapping may be used by an interface dispatcher to connect to the corresponding method in the object's type definition. In many embodiments, the mapping of block 212 may be a temporary or hidden construct that may be used by a linker or a runtime execution component. In such embodiments, the mapping may not be easily viewable or editable.

After compiling, the intermediate code may be stored in block 214. In a runtime environment, the intermediate code may be optimized compiled code that may be further compiled into an executable code for a specific processor or hardware platform. In many runtime environments, the runtime compiler may create assembly code or other machine level code that is specific to the hardware platform. In such cases, the intermediate code may be used on a variety of hardware platforms.

Embodiment 200 is an example of the code development portion of a program lifecycle for a runtime environment. In a classically compiled programming language, the compiler may create machine level code directly without creating an intermediate code. In such a language, the machine level code may be executed without further compilation and linking at runtime.

Figure 3:
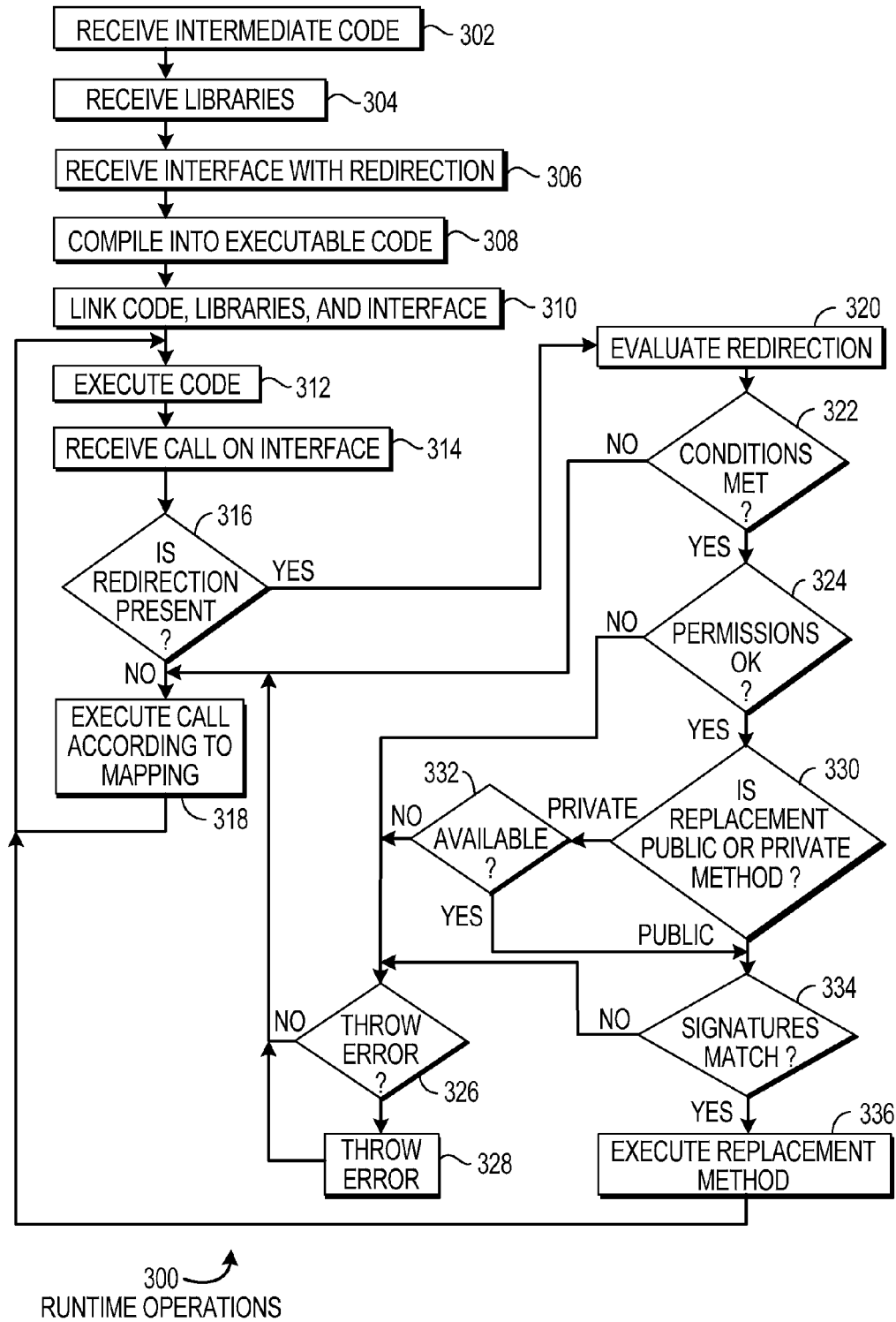
FIG. 3 is a flowchart illustration of an embodiment showing a method for runtime operations in a runtime environment.

FIG. 3 is a flowchart illustration of an embodiment 300 showing a method for runtime operations. Embodiment 300 is a simplified example of a method that may be performed by a runtime environment to prepare intermediate code for execution, and for executing the code when an interface redirection is present.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates the runtime execution of code created by embodiment 200. In many cases, the code created in embodiment 200 may be performed by a software developer and the runtime execution of embodiment 300 may be performed by a software user on a client device. In such a case, the runtime operations of embodiment 300 may be performed by many hundreds of thousands or more users over the course of time, while the developer operations of embodiment 200 may be performed during the development phase.

Like embodiment 200, embodiment 300 illustrates a process that may be performed by a runtime execution system, where linking and compiling may be performed at runtime to produce executable code that is then executed. In a fully compiled embodiment, the linking and compiling may be performed prior to runtime and, at runtime, the code may be directly executed.

In block 302, intermediate code may be received, along with libraries in block 304. The intermediate code of block 302 may be the intermediate code of block 214 of embodiment 200, for example. The libraries of block 304 may be code libraries that contain routines or other code that may be referenced or called by the intermediate code. In some cases, the libraries may be precompiled executables, while in other cases the libraries may be intermediate code that will be further compiled.

In block 306, an interface may be received with a redirection. The interface of block 306 may be a modified version of the interface of block 202, for example. The redirection may be a conditional or unconditional statement within the interface that defines a replacement method for a specific method defined by the interface. In one use scenario, the replacement method may change the functionality of the original method.

A conditional redirection may evaluate various parameters to determine if a redirection may occur. In some cases, the redirection may be predicated on the called type. A programmer may use such a case to effectively replace a single method on a concrete type definition with a different method. Such a redirection may be useful when the source code of the called type is not available for modification. In another instance, a programmer may identify several concrete types for which the interface method may be redirected. Such a redirection may be useful for modifying behavior of several types in the same manner, but leaving other types unchanged.

In some cases, a redirection may be predicated on certain parameters passed to the interface for the original method. In such cases, one or more of the parameters may be evaluated to determine if a specific condition is met and if so, the replacement method may be executed. Such a redirection may be useful when a developer wishes to change the functionality of a method only in certain circumstances.

In some use scenarios, a redirection may be used to intercept and redirect every call to a particular method on an interface, regardless of the object type definition that may contain the original method. In such a scenario, the functionality of potentially many different method definitions may be changed to the functionality defined in a single redirected method.

The code, libraries, and interface may be linked in block 308 and compiled into executable code in block 310. Different languages and different runtime environments may have different mechanisms for linking. A linker may take various objects created by a compiler and combines the objects into a single executable program. Various programming languages may have different terms for a linker, such as loader, linkage editor, or other terms.

In many programming languages, computer programs may comprise several parts or modules, and different files may contain one or more of the parts or modules. The modules may refer to each other by means of symbols. Typically, an object file can contain three kinds of symbols: defined symbols, which allow it to be called by other modules, undefined symbols, which call the other modules where these symbols are defined, and local symbols, used internally within the object file to facilitate relocation.

When a program comprises multiple object files, the linker may combine these files into a unified executable program, resolving the symbols as the linker progresses. Linkers may take objects from a collection called a library. Some linkers may not include the whole library in the output and may only include symbols that are referenced from other object files or libraries.

The linker may arrange objects in a program address space. In some cases, code may be relocated to another location when code assumes addresses used by another object. Relocating machine code may involve re-targeting of absolute jumps, loads and stores, for example. In some embodiments, a linker may make a second relocation pass when an executable code is loaded into memory prior to execution.

In some embodiments, the functions of linker and compiler may be combined into a single operation.

In block 312, the program execution may be performed.

During program execution in block 314, a call may be received on the interface of block 306. If a redirection is not present on the call in block 316, the call may be executed according to the mapping in block 318. The call of block 318 may be to the original method defined in a concrete type definition.

If a redirection is present in block 316, the redirection may be evaluated in block 320. Each embodiment may have different syntax, mechanisms, and capabilities for redirections. The process of blocks 322 through 334 is an example of some of the functions that may or may not be implemented in any specific embodiment. In various embodiments, all of the functions or merely a subset of the functions illustrated in the following blocks may be implemented.

Some embodiments may permit an unconditional redirection. In such a case, a redirection may cause a replacement method to be executed in block 336 without any further evaluation of any conditions.

In block 322, if the conditions are not met for a redirection, the process may go to block 318 and execute the original method. If the conditions are met in block 322, an evaluation of the permission settings is made in block 324. If the permissions are not proper in block 324, the process may proceed to block 326. If the system is configured to throw an error in block 326, the error may be thrown in block 328.

In some embodiments, the error may be thrown in block 328 and the process may return to block 318 to execute the original method. In other embodiments, the thrown error may result in the executing program being halted.

Some embodiments may use an error reporting service to record errors, whereas other embodiments may not log such errors. In some cases, the error recording function may be turned on or off.

The permission settings of block 324 may evaluate whether the various permissions associated with the executing program has proper credentials or settings to execute the replacement method. In some embodiments, a user's permission settings may be used to permit or deny access to the replacement method. In some cases, a service, application, process, thread, or other entity may have permission settings that may be used to permit or deny access to the replacement method.

When permission settings are evaluated, the permission settings of the executing process, thread, application, user, or other entity may be compared to the permission settings that may be associated with the replacement method. The replacement method's permission settings may be associated with a file, library, or other entity related to the replacement method.

The permission settings may be an example of a check that uses either static or dynamic values of the executing code and the replacement method. Static values may be those values set prior to runtime. Dynamic values may be determined at runtime or during runtime. In some embodiments, an application may operate for long periods of time, such as applications that operate for days, weeks, or even years. During such a period, the permission settings or other parameters used for checking the replacement method may be altered or otherwise changed. When a dynamic value is used in the analysis, the value may be collected or determined each time the replacement method is analyzed or at some other point in time during the program execution. In such cases, a dynamic value may be determined multiple times during a program execution.

In block 330, the replacement method may be analyzed with respect to whether the replacement method is a public or private method. In many libraries or groupings of methods, certain methods may be private and callable only from within the library, or public and callable from outside the library. If the replacement method is private in block 330, a check in block 332 may determine if the private method is available in the context of the executing code. If the private method is not available, the process may continue to block 326 to process an error. If the private method is available in block 332 or if the replacement method is a public method in block 330, the process may advance to block 334.

In block 334, an analysis may compare the signatures of the replacement method with the original method. The signatures may be defined by the precise parameters being sent to and received from the respective method. In order for the signatures to match, the same parameters are sent and received between both the original method and the replacement method. If the signatures do not match in block 334, the process may continue to block 326 to process an error. If the signatures do match, the replacement method may be executed in block 336.

The signature matching may be used in embodiments where the replacement method is enforced to conform to the same parameters as the original method. Some embodiments may not include such signature compatibility as a verification of the replacement method.

From block 322 to block 334, several different checks may be made prior to executing the replacement method. Many program execution environments, both runtime environments and other environments, may include various checks such as those described in embodiment 300. Some may include other checks as well.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method being performed on a computer processor, said method comprising:
   creating a first interface as an abstract type, said first interface defining a first abstract method, said first interface implementable by objects having a plurality of different types of classes;
   creating a concrete type that implements said first interface, said concrete type comprising an implementation of said first abstract method as a first concrete method;
   compiling said concrete type to generate executable code, and generating a mapping for said first abstract method to said first concrete method during said compiling;
   modifying said first interface to create a second interface, said second interface comprising a redirection for said first abstract method, said redirection comprising a second concrete method;
   linking said second interface with said executable code;
   determining a first signature for said first concrete method;
   determining a second signature for said second concrete method;
   executing said executable code in a first process;
   during said executing, receiving a call to said second interface for said first abstract method, analyzing said redirection, and causing said second concrete method to be performed instead of said first concrete method; and
   permitting said second concrete method to be executed when said first signature and said second signature match.

2. The method of claim 1, said redirection being an unconditional redirection.

3. The method of claim 1, said redirection being a conditional redirection.

4. The method of claim 3, during said executing:
   receiving a second call for said first abstract method;
   analyzing said redirection to determine that a condition was not met; and
   causing said first concrete method to be executed.

5. The method of claim 4, said analyzing said redirection further comprising determining that said first process does not have privileges to execute said second concrete process.

6. The method of claim 1, said second concrete method being defined in a second executable code.

7. The method of claim 6, said linking further comprising linking said second executable code.

8. The method of claim 1, said linking being performed at runtime.

9. The method of claim 8, at least a portion of said compiling being performed at runtime.

10. The method of claim 9, said generating a mapping being performed prior to runtime.

11. A system comprising:
    at least one processor and a memory;
    a linker configured to perform a first process comprising:
       receiving a first code comprising a mapping between a first set of methods defined in a first version of an interface, said interface being an abstract type, said interface implementable by objects having a plurality of different types of classes, said first version implemented by a first object having a first object type class, and a second set of methods defined in said first code, said second set of methods being concrete methods, a first abstract method being mapped to a first concrete method in said mapping;
       receiving a second version of said interface, said second version comprising a redirection for a first abstract method defined in said first version of said interface, said first abstract method being one of said first set of methods, said redirection comprising a second concrete method, said second version of said interface implemented by an object having a different object type of class than said first object;
       identifying a call to said first abstract method from a second code; and
       linking said second concrete method in place of said first concrete method based on said redirection;
       determining a first signature for said first concrete method;
       determining a second signature for said second concrete method;
    a runtime execution system configured to perform a second process comprising:
       executing said second code;
       executing said call to said first abstract method within said second code;
       evaluating said redirection; and
       executing said second concrete method in place of said first concrete method as defined in said redirection when said first signature matches said second signature;
    a processor on which said runtime execution system executes.

12. The system of claim 11, said redirection comprising a link to said third method.

13. The system of claim 11, said linker being executed on said processor.

14. The system of claim 13, said linker being executed at runtime.

15. The system of claim 11, said linker being executed at compile time.

16. The system of claim 11, said redirection being a conditional redirection.

17. A runtime environment stored in a computer readable memory being executable on a processor, said runtime environment comprising:
- a runtime compiler configured to receive intermediate code and compile said intermediate code to generate executable code;
- a runtime linker configured to:
    - receive a first code comprising a mapping between a first set of methods defined in a first version of an interface, said interface being an abstract type, said interface implementable by objects having a plurality of different types of classes, said first version implemented by a first object having a first object type class, and a second set of methods defined in said first code, said mapping comprising a first abstract method being mapped to a first concrete method;
    - receive a second version of said interface, said second version comprising a redirection for said first abstract method defined in said first version of said interface, said first abstract method being one of said first set of methods, said redirection comprising a second concrete method, said second version of said interface implemented by an object having a different object type of class than said first object;
    - identifying a call to said first abstract method from a second code; and
    - linking said second concrete method in place of said first concrete method based on said redirection;
        - determining a first signature for said first concrete method;
        - determining a second signature for said second concrete method;
- a runtime execution system configured to:
- executing said second code;
- executing said call to said first abstract method within said second code;
- evaluating said redirection; and
- executing said second concrete method in place of said first concrete method as defined in said redirection when said first signature matches said second signature.

18. The runtime environment of claim 17, said second concrete method being defined within said interface.

19. The runtime environment of claim 17, said redirection being an unconditional redirection.

* * * * *